United States Patent
Weber et al.

(10) Patent No.: US 10,917,027 B2
(45) Date of Patent: Feb. 9, 2021

(54) METHOD AND LONG STATOR LINEAR MOTOR FOR TRANSFERRING A TRANSPORT UNIT AT A TRANSFER POSITION

(71) Applicant: B&R INDUSTRIAL AUTOMATION GMBH, Eggelsberg (AT)

(72) Inventors: Andreas Weber, Salzburg (AT); Friedrich Forthuber, Handenberg (AT)

(73) Assignee: B&R INDUSTRIAL AUTOMATION GMBH, Eggelsberg (AT)

( * ) Notice: Subject to any disclaimer, the term of this patent is extended or adjusted under 35 U.S.C. 154(b) by 354 days.

(21) Appl. No.: 16/036,399

(22) Filed: Jul. 16, 2018

(65) Prior Publication Data

US 2018/0323732 A1 Nov. 8, 2018

Related U.S. Application Data

(62) Division of application No. 15/189,416, filed on Jun. 22, 2016, now Pat. No. 10,622,921.

(30) Foreign Application Priority Data

Jun. 23, 2015 (AT) .............................. A 50529/2015

(51) Int. Cl.
*H02K 41/03* (2006.01)
*H02P 6/00* (2016.01)
(Continued)

(52) U.S. Cl.
CPC .......... *H02P 6/006* (2013.01); *B60L 13/003* (2013.01); *B60L 13/03* (2013.01); *B65G 54/02* (2013.01);
(Continued)

(58) Field of Classification Search
CPC .......... F16C 29/00; F16C 29/04; F16C 33/66; H02K 41/02; H02K 5/16
See application file for complete search history.

(56) References Cited

U.S. PATENT DOCUMENTS

| 5,904,101 | A | * | 5/1999 | Kuznetsov | .............. | B60L 13/10 |
| | | | | | | 104/130.02 |
| 6,101,952 | A | | 8/2000 | Thornton et al. | | |

(Continued)

FOREIGN PATENT DOCUMENTS

| CN | 104578673 | 4/2015 |
| DE | 1 963 505 | 7/1970 |

(Continued)

OTHER PUBLICATIONS

Office Action/Search Report conducted in counterpart Austria Appl. No. A 50529/2015-1 (dated Jun. 7, 2016) (w/ Partial Machine Translation).

(Continued)

*Primary Examiner* — Tran N Nguyen
*Assistant Examiner* — Leda T Pham
(74) *Attorney, Agent, or Firm* — Greenblum & Bernstein, P.L.C.

(57) ABSTRACT

Method for transferring a transport unit of a long stator linear motor at a transfer position from a first transport section to a second transport section. On each side of the transport unit, excitation magnets are arranged to interact with driving coils, and on both sides of the transport unit, excitation-magnetic lateral forces are acting on the transport unit by an interaction of the excitation magnets with ferromagnetic components of the guide structure. Method includes supplying on at least one side of the transport unit a stator current n a driving coil to generate a lateral force-forming electromagnetic force that acts on the transport unit, so that a resulting lateral force, as a sum of the acting (Continued)

excitation-magnetic lateral force and of the lateral force-forming electromagnetic force, on each side of the transport unit is different to produce a steering effect on the transport unit at the transfer position.

16 Claims, 7 Drawing Sheets

(51) Int. Cl.
  *B60L 13/00* (2006.01)
  *B65G 54/02* (2006.01)
  *H02P 21/06* (2016.01)
  *H02P 21/12* (2016.01)
  *H02P 25/064* (2016.01)
  *H02P 25/062* (2016.01)
  *B60L 13/03* (2006.01)
  *E01B 25/12* (2006.01)
  *E01B 25/34* (2006.01)

(52) U.S. Cl.
  CPC .............. *H02K 41/03* (2013.01); *H02P 21/06* (2013.01); *H02P 21/12* (2013.01); *H02P 25/062* (2016.02); *H02P 25/064* (2016.02); *E01B 25/12* (2013.01); *E01B 25/34* (2013.01); *H02K 41/031* (2013.01); *Y02P 70/10* (2015.11); *Y02T 10/64* (2013.01)

(56) References Cited

U.S. PATENT DOCUMENTS

| | | | |
|---|---|---|---|
| 6,876,107 | B2 | 4/2005 | Jacobs |
| 2008/0115372 | A1 | 5/2008 | Vogel et al. |
| 2013/0074724 | A1 | 3/2013 | King et al. |
| 2013/0229134 | A1 | 9/2013 | Sato |
| 2015/0083018 | A1 | 3/2015 | Clark et al. |

FOREIGN PATENT DOCUMENTS

| | | |
|---|---|---|
| DE | 4 133 114 | 4/1993 |
| EP | 2 634 913 | 9/2013 |
| FR | 2 730 876 | 8/1996 |
| GB | 1 247 257 | 9/1971 |
| WO | 2004/103792 | 12/2004 |
| WO | 2004/103972 | 12/2004 |
| WO | 2013/143783 | 10/2013 |
| WO | 2015/036302 | 3/2015 |
| WO | 2015/042409 | 3/2015 |

OTHER PUBLICATIONS

Khong et al., "Magnetic Guidance of the Mover in a Long-Primary Linear Motor", *IEEE Transaction on Industry Applications*, IEEE Service Center, Piscataway, NJ, US, vol. 47, No. 3, May 1, 2011 (May 1, 2011), pp. 1319-1327, XP011477767, ISSN: 0093-9994, DOI: 10.1109/TIA.2011.2125934.

Office Action/Search Report conducted in counterpart European Appl. No. 161 74 356.2-1806 (dated Nov. 7, 2016) (w/ Partial English language Translation).

* cited by examiner

METHOD AND LONG STATOR LINEAR MOTOR FOR TRANSFERRING A TRANSPORT UNIT AT A TRANSFER POSITION

CROSS-REFERENCE TO RELATED APPLICATION

This application is a Divisional of U.S. application Ser. No. 15/189,416 filed Jun. 22, 2016, which claims priority under 35 U.S.C. § 119(a) of Austrian Patent Application No. A 50529/2015 filed Jun. 23, 2015, the disclosures of which are expressly incorporated by reference herein in their entireties.

DISCUSSION OF BACKGROUND

1. Field of the Invention

The present invention relates to a method for transferring a transport unit of a long stator linear motor at a transfer position from a first transport section, having a number of driving coils arranged one behind the other in the direction of movement of the transport unit in the region of the transfer position, to a second transport section, having a number of driving coils arranged one behind the other in the direction of movement of the transport unit in the region of the transfer position (U), wherein on each side of the transport unit excitation magnets are arranged which interact with driving coils in the region of the transport unit, and for movement of the transport unit driving coils in the region of the transport unit are in each case supplied with a stator current for generation of a magnetic flux which generates a propulsive force acting on the transport unit. The invention further relates to a long stator linear motor with a transfer position.

2. Discussion of Background Information

In almost all modern production facilities it is necessary to move structural parts or components, even over relatively long transport lines, by transport equipment between individual production stations. For this purpose a plurality of transport or conveying devices are known. Various designs of continuous conveyors are frequently used for this purpose. Conventional continuous conveyors are conveyor belts in different embodiments, in which a rotary movement of an electrical drive unit is converted into a linear movement of the conveyor belt. With such conventional continuous conveyors flexibility is considerably restricted, in particular individual transport of single transport units is not possible. In order to remedy this and in order to meet the requirements for modern, flexible transport equipment, so-called long stator linear motors (LLMs) are increasingly being used to replace conventional continuous conveyors.

In a long stator linear motor a plurality of electrical driving coils which form the stator are arranged along a transport line. On a transport unit is arranged a number of excitation magnets, either as permanent magnets or as an electrical coil or shading coil, which co-operate with the driving coils. The long stator linear motor can be designed as a synchronous motor, both self-excited or extraneously excited, or as an asynchronous motor. By control of the individual driving coils, in order to regulate the magnetic flux, a propulsive force is generated and the transport unit can be moved along the transport line. Hereby it is also possible to arrange a plurality of transport units, of which the movements can be controlled individually and independently of one another, along the transport line. A long stator linear motor is characterized in particular by a better and more flexible use over the entire operating range of the movement (speed, acceleration), an individual regulation/control of the transport units along the transport line, an improved use of energy, the reduction of maintenance costs due to the smaller number of wear parts, simple replacement of the transport units, efficient monitoring and detection of faults and optimization of the flow of products. Examples of such long stator linear motors can be found in WO 2013/143783 A1, U.S. Pat. No. 6,876,107 B2, U.S. 2013/0074724 A1 or WO 2004/103792 A1.

In U.S. 2013/0074724 A1 and WO 2004/103792 A1 the driving coils of the stator are arranged on the top side of the transport line. The permanent magnets are arranged on the underside of the transport units. In WO 2013/143783 A1 and U.S. Pat. No. 6,876,107 B2 the permanent magnets are provided on both sides of the centrally arranged driving coils, whereby the permanent magnets surround the stator of the long stator linear motor and the driving coils co-operate with the permanent magnets arranged on both sides.

The transport units are guided along the transport lines either by guide rollers, such as for example in WO 2013/143783 A1 or U.S. Pat. No. 6,876,107 B2, or by magnetic guiding, such as for example in WO 2004/103792 A1. In the case of magnetic guiding, guide magnets which co-operate with opposing guide bars arranged on the transport line are provided on the transport unit on both sides. In this case the guide bars form a magnetic yoke which closes the magnetic circuit of the guide magnets. The magnetic guide circuits thus formed counteract a lateral movement of the transport units, whereby the transport units are guided laterally. A similar magnetic lateral guiding can also be seen in U.S. Pat. No. 6,101,952 A.

In many transport systems, transfer positions, for example in the form of switch points, are necessary in order to enable complex and intelligent route planning or route implementation for the transport device. In the past these transfer positions have often been implemented with the aid of additional mechanical actuating units. An example of this can be found in U.S. 2013/0074724 A1 in the form of a mechanically actuated switch point by means of movable deflecting arms or of a turntable.

However, transport systems have already become known in which additional electrical auxiliary coils are used in order to effect actuation of switch points. In U.S. Pat. No. 6,101,952 A the auxiliary coils are for example arranged on the magnetic yoke of the magnetic guide circuit, whereas in U.S. 2013/0074724 A1 the auxiliary coils are arranged laterally on the transport line. In both cases a magnetic flux is introduced into the magnetic guide circuit by the auxiliary coils and generates a lateral force which steers the transport unit in one direction. However, the additionally necessary auxiliary coils increase the cost of implementation of transport systems, since the auxiliary coils have to be additionally installed and electrically supplied and controlled. In addition, separate guide magnets on the transport units are also necessary.

In DE 1 963 505 A1, WO 2015/036302 A1 and WO 2015/042409 A1, magnetically activated switch points of a long stator linear motor are described, which function without additional auxiliary coils. In these long stator linear motors the excitation magnets of the transport units are arranged between driving coils arranged on both sides. In the region of a switch point, by supply of power to the driving coils on only one side of the transport line a lateral force is generated by which the transport unit can be steered in the region of the switch point in order to move the transport unit forward after the switch point onto the required transport line. In this case the actuation of switch points takes place in such a way that the driving coils in the region of the switch point are activated only on the side of the transport line along on which the transport unit is to move forward. The driving coils of the other side are deactivated (DE 1 963 505 A1, WO 2015/036302 A1, WO 2015/042409 A1) or have their polarity reversed (WO 2015/036302 A1). However, this brings certain problems with it. If the driving coils of one side are deactivated in the region of the switch point, the transport unit loses half of the propulsive force in the region of the switch point, so that it is only possible to travel through the region of the switch point at a reduced speed. Thus, congestion of the transport units could occur in the region of the switch point, which would be unfavorable for control of the transport device. The reversal of polarity is purely static and a specific, predetermined lateral force can be activated or deactivated. Thus, a specific predetermined lateral force can be set in the region of the switch point by reversal of polarity. If, for reasons of safety when travelling through the switch point, the lateral force is oversized which leads to increased friction and increased wear. Thus, the transport units would have to be mechanically appropriately dimensioned, which makes the transport units larger, heavier and more expensive. Thus, apart from this, the wear on the mechanical components of the transport unit, in particular the mechanical guide elements, is increased. On the other hand, if the lateral force is chosen to be smaller, the safety of travel through the switch points is decreased as a result, for example if the transport unit with load is actually heavier than assumed. Thus, the reversal of polarity for actuation of switch points is rather disadvantageous for the operation of a long stator linear motor.

SUMMARY

According to embodiments, the present invention provides a transport device in the form of a long stator linear motor in which a transfer position can be implemented in which the transport units are steered magnetically and remain as unaffected as possible by the transfer.

In embodiments, for transfer of the transport unit at the transfer position, on at least one side of the transport unit the stator current of at least one driving coil interacting with an excitation magnet of the transport unit is supplied as a current vector with a propulsive force-forming current component and a lateral force-forming current component, and the stator current generates a propulsive force-forming electromagnetic force and/or lateral force-forming electromagnetic force component which is superimposed on the propulsive force acting on the transport unit for production of a steering effect. No additional auxiliary elements (such as for instance coils, switches, etc.) are required for steering the transport unit in the transfer position. The actuation takes place purely by the driving coils required for the advancing movement and is based on a control of the electromagnetic field. By the superposition of additional propulsive force-forming and/or lateral force-forming force components on the propulsive force responsible for the movement of the transport unit, a steering effect can be generated without influencing the advancing movement of the transport unit. In particular this allows also decoupling the control of the propulsive force, which is in any case implemented, from the control of the steering effect. The propulsive force is often controlled by position presetting and required force components can now be simply superimposed upon it in order to bring about the steering effect.

A propulsive force-forming and/or lateral force-forming electromagnetic force component which is superimposed on the propulsive force is preferably generated on both sides of the transport unit. Thus, there are more possibilities for applying the required steering effect in terms of direction and magnitude onto the transport unit.

In a first preferred embodiment, lateral force-forming electromagnetic force components in the same direction are generated on both sides of the transport unit. This can be achieved by attenuation of the effective magnetic flux on one side of the transport unit. In this way a high steering force can be generated very simply and efficiently as a steering effect.

In a second preferred configuration the propulsive force of the transport unit is controlled by position presetting and on at least one side of the transport unit the position presetting is modified by a modification factor. In this way a steering torque can be generated very simply and efficiently as a steering effect. In this case it is particularly advantageous if the modification factor is set on both sides with the same value and different algebraic sign, since the control is considerably simplified thereby.

Particularly advantageously, a steering controller and a position controller are implemented in a segment control unit, wherein the steering controller compensates for a flux error as the difference between a desired flux and an actual flux, and for this purpose determines the lateral force-forming current component of the stator current and/or a modification factor, and the position controller compensates for a position error as the difference between a desired position and an actual position and which possibly includes the modification factor, and for this purpose determines the propulsive force-forming current component of the stator current. In this way the control of the steering effect can be very simply incorporated into a position control of the transport unit.

BRIEF DESCRIPTION OF THE DRAWINGS

The embodiments are explained in greater detail below with reference to FIGS. 1 to 10, which show by way of example, schematically and without limitation, advantageous embodiments of the invention. In the drawings.

DETAILED DESCRIPTION

Figure 1:
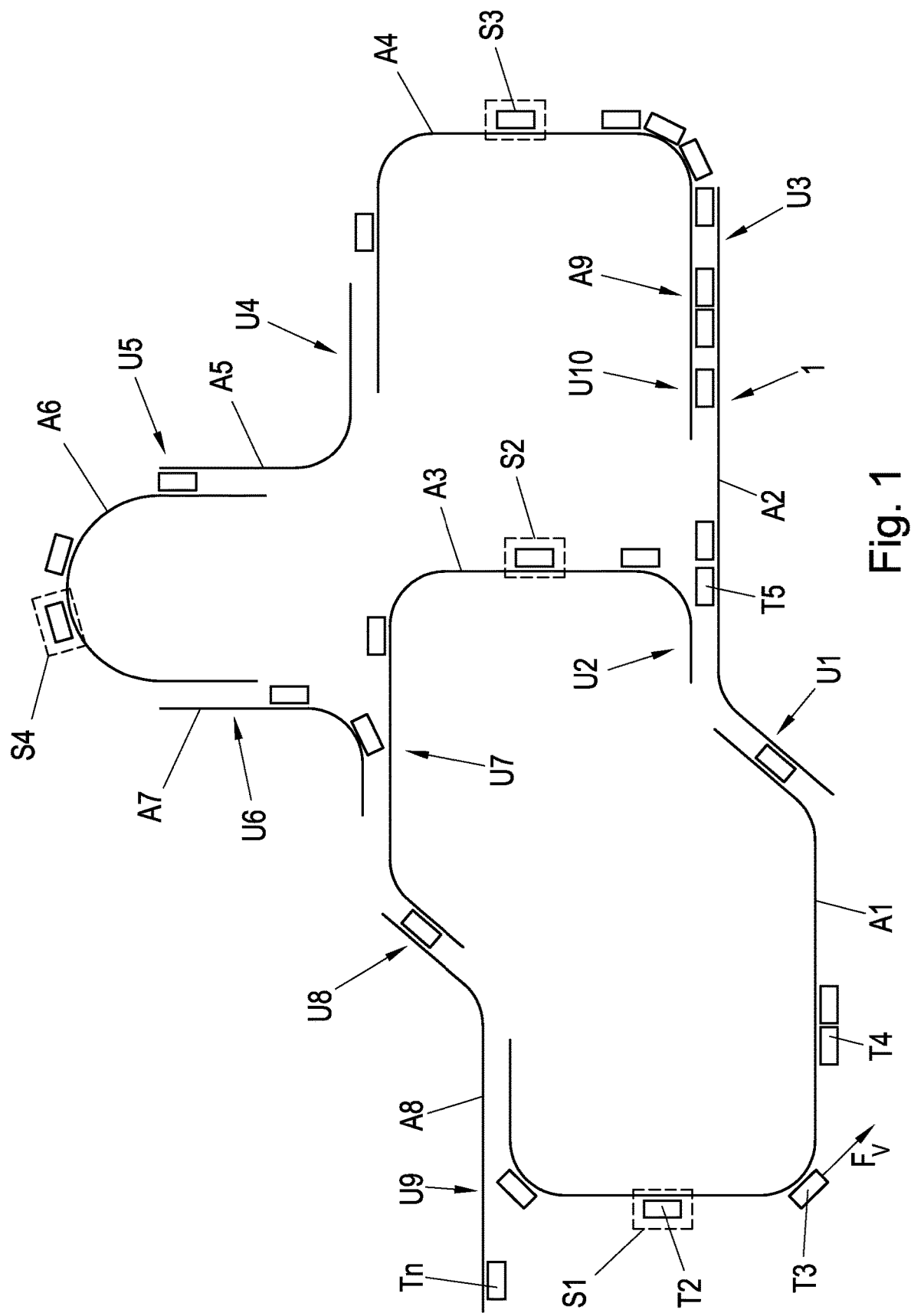
FIGS. 1 and 2 in each case show a transport device in the form of a long stator linear motor.

A transport device 1 in the form of a long stator linear motor is illustrated by way of example in FIG. 1. The transport device 1 consists of a plurality of transport sections A1 . . . A9, which are assembled into the transport device 1. This modular construction enables a very flexible design of the transport device 1, but also requires a plurality of transfer positions U1 . . . U9, at which the transport units T1 . . . Tn moving on the transport device 1 (for reasons of clarity not all of the transport units are identified by a reference numeral in FIG. 1) are transferred from one transport section A1 . . . A9 to another.

The transport device 1 is configured as a long stator linear motor, in which the transport sections A1 . . . A9 each form a part of a long stator of a long stator linear motor in a manner which is known per se. Therefore a plurality of electrical driving coils are arranged in the longitudinal direction along the transport sections A1 . . . A9 in a known manner (not shown in FIG. 1 for reasons of clarity) and co-operate with excitation magnets on the transport units T1 . . . Tn (see FIG. 3). In a manner which is likewise known, by control of the electrical stator current A of the driving coils 7, 8 for each of the transport unit T1 . . . Tn a propulsive force $F_V$ is generated which moves the transport units T1 . . . Tn in the longitudinal direction along the transport sections A1 . . . A9, that is to say along the transport line. In this case each of the transport units T1 . . . Tn can be moved individually (speed, acceleration, path) and independently (apart from avoiding possible collisions) of the other transport units T1 . . . Tn. Since this basic principle of a long stator linear motor is sufficiently known, it is not discussed in greater detail here.

It is likewise known for a transport section A1 . . . A9 to be composed of individual transport segments TS which in each case carry a plurality of driving coils and which in each case are controlled by an associated segment control unit 11, as is described for example in U.S. Pat. No. 6,876,107 B2 and illustrated in FIG. 9. A transport unit T1 . . . Tn located in a transport segment TS is therefore controlled by the associated segment control unit 11. Primarily this means that the segment control unit 11 controls the driving coils 7, 8 of the associated transport segment TS so that the transport unit T1 Tn is moved by the propulsive force in the desired manner (speed, acceleration) along the transport segment TS. If a transport unit T1 . . . Tn moves from a transport segment TSn into the next in transport segment TSn+1, the control of the transport unit T1 . . . Tn is also transferred in an ordered manner to the segment control unit $11_{n+1}$ of the next transport segment TSn+1. The movement of the transport unit T1 . . . Tn through the transport device 1 is monitored in a higher-level system control unit 10, which is connected to the segment control unit 11. The system control unit 10 controls the movement of the transport unit Tn through the transport device 1, for example by position presetting. The segment control units 11 then compensate for any errors between the desired value and the actual value.

Several transfer positions U1 . . . U10 are also arranged along the transport line of the transport device 1. In this case different types of transfer positions U1 . . . U10 are conceivable. A switch point is provided for example at the transfer positions U2 and U7, whereas the other transfer positions U1, U3 U6, U8, U9 are designed for example as changeover points from one transport section A1 . . . A8 to another. A transition from a one-sided transport section A2 to a two-sided transport section A9 is provided for example at the transfer position U10. At the transfer position U2 (switch point) a transport unit T6 can be moved further, for example on the transport section A2 or the transport section A3. At a transfer position U1 (changeover position) a transport unit T5 is transferred from the one-sided transport section A1 to the one-sided transport section A2.

A plurality of work stations S1 . . . S4, in which a manipulation takes place on the components transported by the transport unit T1 . . . Tn, can also be arranged along the transport line of the transport device 1, which is defined predominantly by the longitudinal direction of the transport section A1 . . . A8. The work station S1 can for example be configured as a feed and/or discharge station in which finished components can be removed and components to be processed are transferred to a transport unit T1 . . . Tn. Any processing steps can be carried out on the components in the work stations S2 . . . S4. In this case the transport units T1 Tn can be stopped for processing in a work station S1 . . . S4, for example in a filling station in which empty bottles are filled, or can be moved through, for example in a tempering station in which components are thermally treated, if required also at a different speed than between the work stations S1 . . . S4.

Figure 2:
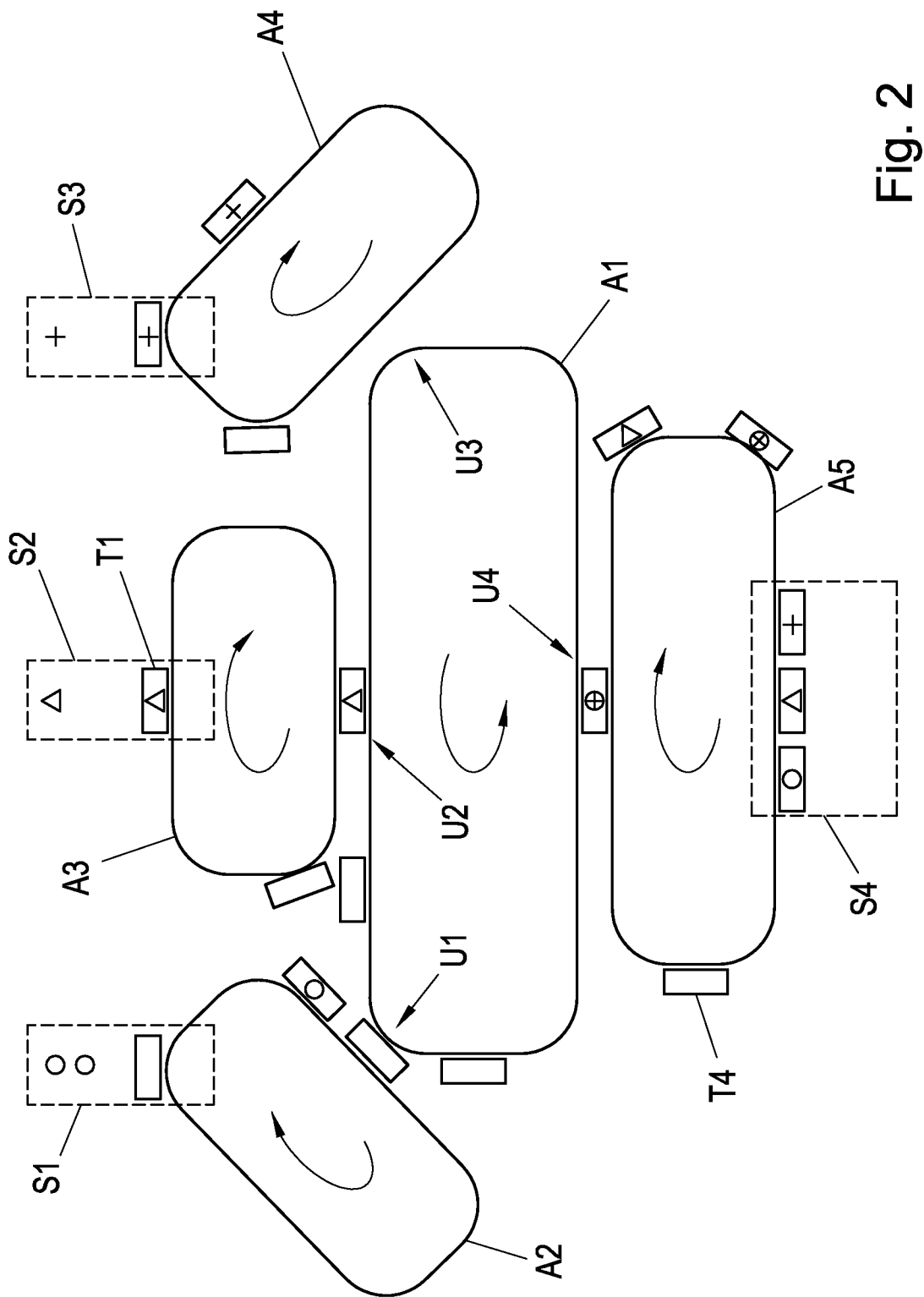

Another example of a transport device 1 is illustrated in FIG. 2. Five closed transport sections A1 . . . A5 are provided here. In this case the transport sections A2 . . . A4 serve for feeding different components at the work stations S1 . . . S3. In a work station S4 of a transport section A5 these components are connected to one another or processed in some other way and are discharged from the transport device 1. A further transport section A1 serves for transferring the components from the transport sections A2, A3, A4 into the transport section A5. For this purpose transfer positions U1, U2, U3 are provided in order to transfer the transport units Tn with the different components into the transport section A1. For this purpose a transfer position U4 is provided in which the transport units Tn with the different components are transferred into the transport section A5.

In order to be able to implement a transfer position U1 . . . U10 according to the invention, it is necessary, at least in the region of the transfer position U1 . . . U10, that driving coils 7, 8 are provided on both sides of the transport unit Tn and that excitation magnets 4, 5 are arranged on both sides of the transport unit Tn as viewed in the direction of movement. The excitation magnets can be configured as permanent magnets or as electromagnets. A particularly advantageous embodiment of the long stator linear motor, at least in the region of the transfer position U, is explained with reference to FIG. 3.

Figure 3:
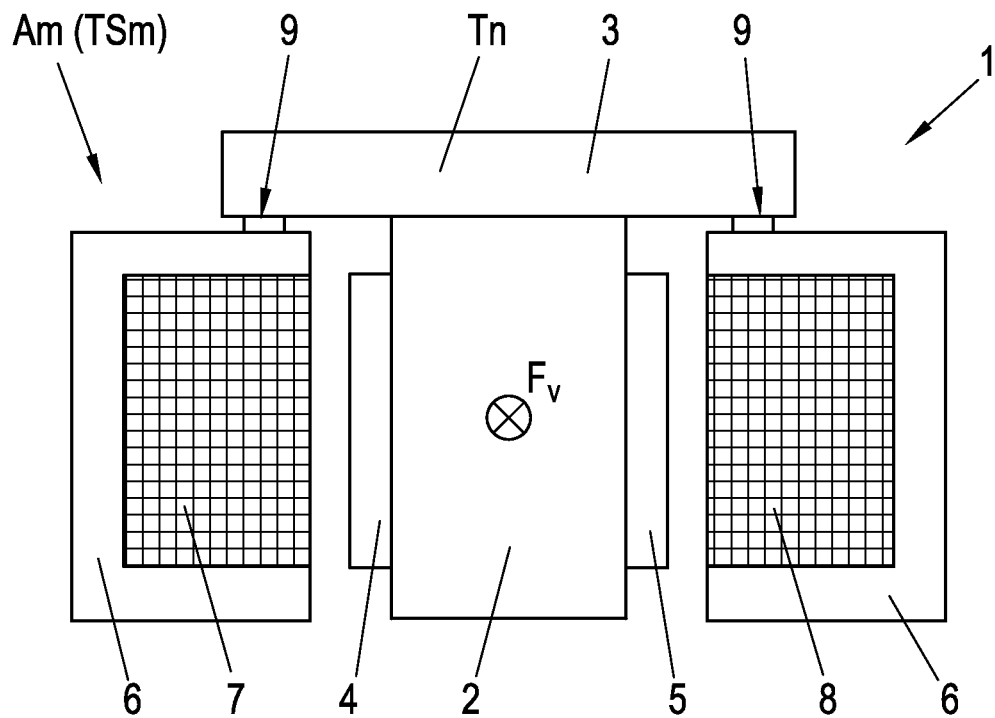
FIG. 3 shows the structural and electrical layout of the long stator linear motor.

FIG. 3 shows a cross-section through any transport section Am and a transport unit Tn moved thereon. A transport unit Tn consists here of a main body 2 and a component receptacle 3 arranged thereon, wherein the component receptacle 3 can basically be arranged at any point on the main body 2, in particular also on the underside for suspended components. The plurality of excitation magnets 4, 5 of the long stator linear motor is arranged on the main body 2 on both sides of the transport unit Tn. The transport line of the transport device 1, or of a transport section Am, or of a transport segment TSm of a transport section Am, is formed by a stationary guide structure 6 on which the driving coils 7, 8 of the long stator linear motor are arranged. In this case the main body 2 with the permanent magnets 4, 5 arranged on both sides is arranged between the driving coils 7, 8. Thus, in each case at least one excitation magnet 4, 5 is arranged opposite a driving coil 7, 8 (or a group of driving coils) and thus interacts with the driving coil 7, 8 for generation of a propulsive force $F_V$. Thus, the transport unit Tn is movable between the guide structures 6 and along the transport line. Naturally, other guide elements 9 (not illustrated or only indicated here for reasons of clarity), such as rollers, wheels, sliding surfaces, etc., can also be provided on the main body 2 and/or on the component receptacle 3 in order to guide the transport unit Tn along the transport line. In this case, for guiding purposes the guide elements of the transport unit Tn co-operate with the stationary guide structure 6, for example in that the guide elements 9 are supported on the guide structure 6, or slide or roll thereon. However, the guiding of the transport unit Tn can also take place at least by the provision of guide magnets.

In order to move a transport unit Tn forward, it is known to supply a stator current $i_{A1}$, $i_{A2}$ to the driving coils 7, 8 on both sides, wherein different stator currents $i_{A1}$, $i_{A2}$ can also be supplied to different driving coils 7, 8. In this case it is also sufficient to supply a stator current $i_{A1}$, $i_{A2}$ only to the driving coils 7, 8 which can interact with the excitation magnets 4, 5 on the transport unit Tn. In order to generate a propulsive force $F_V$ acting on the transport unit Tn, a driving coil 7, 8 is supplied with a stator current IA with a propulsive force-forming current component $i_{Aq}$.

For the movement of the transport unit Tn, however, the driving coils 7, 8 arranged on both sides do not have to be supplied simultaneously with a stator current $i_A$. In principle it is sufficient if the propulsive force $F_V$ acting on the transport unit Tn for movement is generated only by means of the driving coils 7, 8 on one side and the permanent magnet 4, 5 on the associated side of the transport unit Tn. On line sections of the transport line on which a large propulsive force $F_V$ is required, for example in the event of an incline, a heavy load or in regions of acceleration of the transport unit Tn, the driving coils 7, 8 can be energized on both sides (for example transport section A9 in FIG. 1), so that the propulsive force $F_V$ can be increased. Likewise it is conceivable that in certain transport sections A the guide structure 6 is only implemented on one side, or that in certain transport sections A the guide structure 6 is implemented on two sides, but is only equipped with driving coils 7, 8 on one side. This case it is also indicated in FIG. 1, in which line sections with a guide structure 6 on both sides and line sections with a guide structure 6 only on one side are indicated.

A transfer position U according to the invention, in this case in the form of a switch point, such as for example the transfer position U2 in FIG. 1, between two transport sections Am, An will now be explained with reference to FIG. 4. As described above, the driving coils 7, 8 are arranged one behind the other in direction of movement along the transport sections Am, An. The transport sections Am, An consist here of transport segments TSm1, TSm2, TSm3, TSm4, TSm5 or TSn1, TSn2, TSn3, TSn4, arranged one after the other in the longitudinal direction, in each case with a plurality of driving coils 7, 8. Especially in the case of a switch point as transfer position U, in the region of the exit (or entry in the reverse direction of travel) a line section is present on which a guide structure 6 or driving coils 7, 8 can be arranged only on one side.

A transport unit Tn is moved along the transport line, in this case initially the transport section Am. For this purpose, in the region of the transport unit Tn, that is to say in the region in which the excitation magnets 4, 5 of the transport unit Tn and driving coils 7, 8 can interact, the driving coils 7, 8 are supplied with a stator current $i_A$, wherein the stator currents $i_{A1}$, $i_{A2}$ of these driving coils 7, 8 do not have to be the same. This is ensured by the associated segment control unit $11_{mi}$ (see FIG. 9). The stator current $i_{A1}$, $i_{A2}$, or the propulsive force-forming components $i_{Aq1}$, $i_{Aq2}$ of the driving coils 7, 8, in co-operation with the excitation magnets 4, 5, generates the propulsive force $F_V$ acting on the transport unit Tn.

The excitation-magnetic lateral forces $F_{PMS1}$, $F_{PMS2}$ always act on the transport unit Tn on both sides of the excitation magnets because of the co-operation of the excitation magnets 4, 5 of the transport unit Tn with ferromagnetic components of the guide structure 6. The excitation-magnetic lateral forces $F_{PMS1}$, $F_{PMS2}$ acting on both sides of the transport unit Tn are of equal magnitude and opposing directions in the normal case, with the same air gap, the same construction of the guide structure 6 on both sides, etc., so that the vectorial sum of the acting excitation-magnetic lateral forces $F_{PMS1}$, $F_{PMS2}$ is zero. In the ideal case the transport unit Tn is therefore free of lateral forces.

The basis of the present invention is that the magnetic flux $\psi$ or the magnetic field between the transport unit Tn and the driving coils 7, 8 or the guide structure 6, which in the normal case is produced by the permanent magnets 4, 5, is influenced in a targeted manner in order to introduce a steering effect L into the transport unit Tn. For this purpose the current vector, which is responsible for the magnetic field, of the stator current $i_A$ of at least one driving coil 7, 8 is modified so that a propulsive force-forming and/or lateral force-forming electromagnetic force component is produced, which is superimposed on the propulsive force $F_V$. In this case the objective is generally that the acting propulsive force $F_V$, and thus the movement of the transport unit Tn, is not influenced.

In a first embodiment of the invention, by means of the stator current $i_A$, or the magnetic flux $\psi$ emanating therefrom (the magnetic flux $\psi$ and the stator current $i_A$ should be considered to be equivalent), not only the propulsive force $F_V$ required for the movement of the transport unit Tn is generated, but also a lateral force-forming electromagnetic force component $F_{EMS}$, also referred to in the following as an electromagnetic lateral force, is generated. For this purpose a stator current $i_A$ is supplied to a driving coil 7, 8 co-operating with the transport unit Tn which, in addition to the propulsive force-forming electromagnetic force component which effects the propulsive force $F_V$, produces also a force component transversely thereto, that is to say in the lateral direction. Thus, the electromagnetic lateral force $F_{EMS}$ is superimposed on the propulsive force $F_V$. In this case the components $\psi_d$ of the introduced electromagnetic field which produce the lateral force serve in practice to weaken or strengthen the acting excitation-magnetic field. Thus the transport unit Tn is acted on by the resulting lateral forces F1, F2, which are in each case produced as the sum of the acting excitation-magnetic lateral force $F_{PMS}$ and, if present, the electromagnetic lateral force $F_{EMS}$ on each side of the transport unit Tn, that is to say $F_1 = F_{PMS1} - F_{EMS1}$ and $F_2 = F_{PMS2} + F_{EMS2}$ (see FIG. 5).

Wherever no electromagnetic lateral force $F_{EMS}$ is required, that is to say for example outside a transfer position U, the current vector of the stator currents $i_{A1}$, $i_{A2}$ supplied to the driving coils 7, 8 is preferably controlled so that the vectorial sum of the resulting lateral forces $F_1$, $F_2$ is zero. In the ideal case this means that the electromagnetic lateral forces $F_{EMS1}$, $F_{EMS2}$ are equal to zero. Thus, in these regions a maximum efficiency of the movement of the transport unit Tn is achieved, since all of the energy flows into the generation of the propulsive force $F_V$.

In addition, in the entry region of the transfer position U (FIG. 4 above) the stator currents $i_{A1}$, $i_{A2}$ are preferably supplied on both sides so that the vectorial sum of the resulting lateral forces $F_1$, $F_2$, or the electromagnetic lateral forces $F_{EMS1}$, $F_{EMS2}$, is zero. The resulting lateral forces $F_1$, $F_2$, which are therefore reduced to the excitation-magnetic lateral forces $F_{PMS1}$, $F_{PMS2}$, are therefore of the same magnitude and in opposing directions in the entry region of the transfer position U in the normal case and thus cancel each other out.

Figure 5:
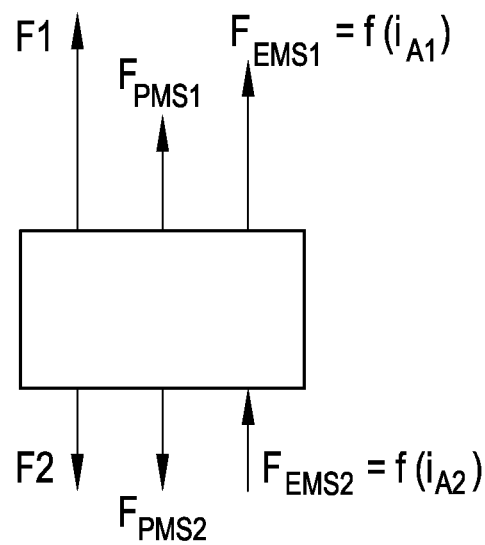
FIG. 5 shows the forces acting on the transport unit in this first embodiment.

In the transfer region (middle of FIG. 4) of the transfer position U the stator currents $i_{A1}$, $i_{A2}$ which are supplied to the driving coils 7, 8 are now changed so that resulting lateral forces $F_1$, $F_2$ which differ in magnitude are produced on both sides of the transport unit Tn from weakening or strengthening of the permanent magnetic field. Since the magnetic flux $\psi$ is a function of the stator current vector $i_A$, the magnetic flux component $\psi_d$ responsible for the lateral force can be changed by changing of the current vector of the stator current $i_A$ on one side, or also on both sides, of the transport unit Tn, in order to generate the electromagnetic lateral force $F_{EMS1}$, $F_{EMS2}$ on at least one side. The magnetic flux $\psi$ is preferably changed so that the electromagnetic lateral forces $F_{EMS1}$, $F_{EMS2}$ on both sides of the transport unit Tn are directed in the same direction (FIG. 5). It is also possible to change the magnetic flux iv so that the electromagnetic lateral forces $F_{EMS1}$, $F_{EMS2}$ have different directions on both sides of the transport unit Tn, but these would partially cancel each other out, which would ultimately be associated with higher losses. If a plurality of driving coils 7, 8 simultaneously interact with the transport unit Tn, which is normally the case, then the magnetic flux $\psi$ of one of the acting driving coils 7, 8, or a plurality of the acting driving coils 7, 8 or also all of the acting driving coils 7, 8 can be changed. Likewise it is conceivable to generate an electromagnetic lateral force $F_{EMS1}$, $F_{EMS2}$ only on one side of the transport unit Tn. In this case only the generated resultant of the forces acting on the transport unit Tn is crucial.

Figure 4:
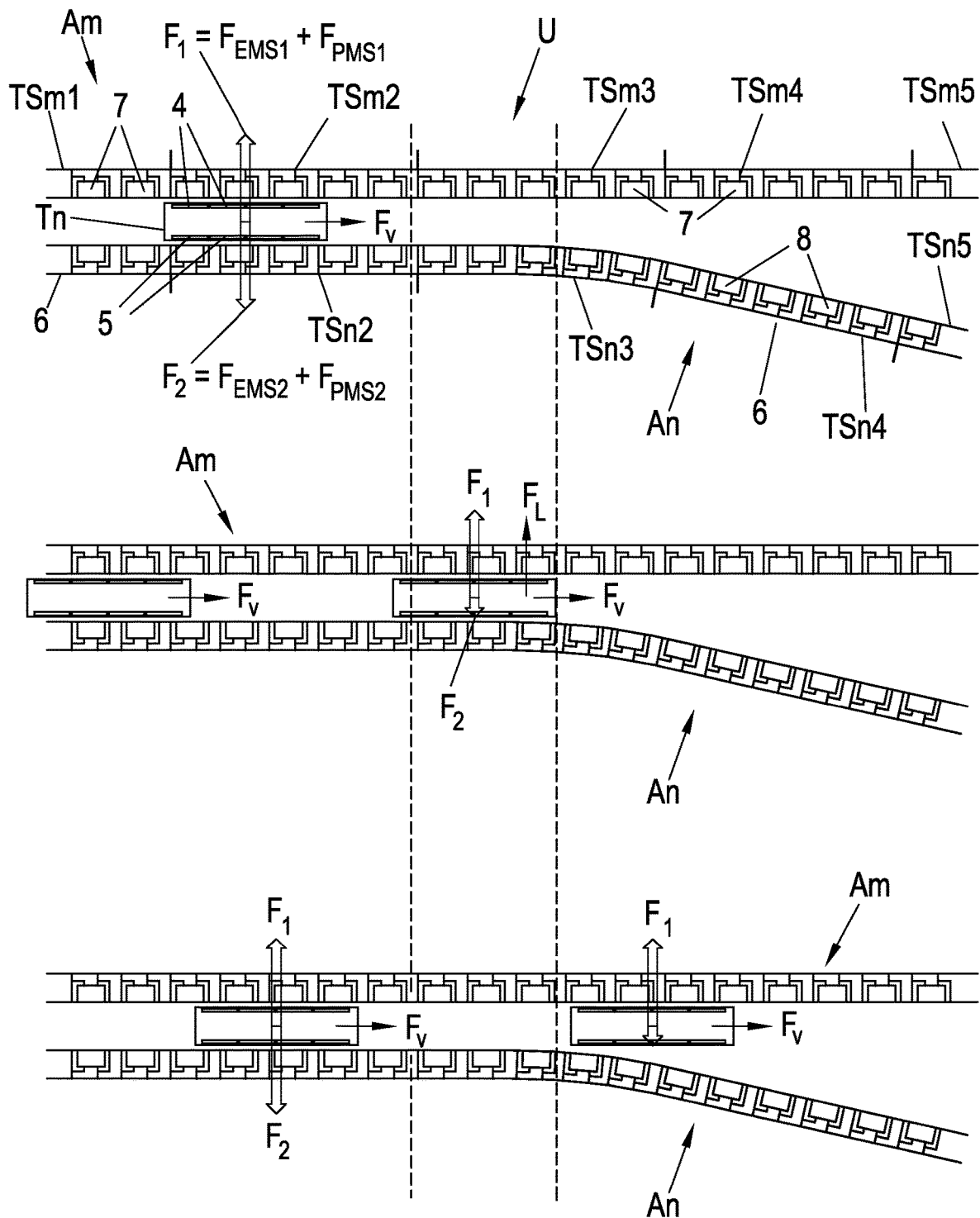
FIG. 4 shows a first embodiment of a method according to the invention for transferring a transport unit at a transfer position.

In the middle of FIG. 4, for example, the stator current $i_{A1}$ of the driving coils 7 of the transport section Am, in the region of which the transport unit Tn is located, is controlled so that an electromagnetic lateral force $F_{EMS1}=f(i_{A1})$ is produced in one direction. On the opposite side the stator current $i_{A2}$ of the driving coils 8 of the transport section Am, in the region of which the transport unit Tn is located, is controlled so that due to the magnetic flux component $\psi_d$ an electromagnetic lateral force $F_{EMS2}=f(i_{A2})$ is produced in the same direction. Thus the lateral force $F_1$ acting on one side is increased and the lateral force $F_2$ acting on the other side is simultaneously decreased. However, it may be sufficient to generate an electromagnetic lateral force $F_{EMS}$ only on one side. Thus the transport unit Tn experiences a steering force $F_L$ resulting from the vectorial sum of the two lateral forces $F_1$, $F_2$, that is to say $F_L=F_1+F_2$. In the illustrated exemplary embodiment the resulting steering force $F_L$ guides the transport unit Tn along the transport section Am, whereby the transport unit Tn is moved further straight ahead in the exit region of the transfer position U (bottom of FIG. 4).

In this case the field weakening takes place on the side of the transport unit Tn along which the transport unit Tn is not to be moved further, in this instance on the driving coils 8. The field strengthening takes place on the side on which the transport unit Tn is to be moved further, in this instance on the driving coils 7.

Thus it is obvious that, by control of the stator currents $i_A$ in the region of the transfer position, a steering force $F_L$ in one of the two lateral directions can be generated as a steering effect L which guides the transport unit Tn along the desired transport section Am or An. Hereby, however, it is possible to define not only the direction but in particular also the magnitude of this steering force $F_L$ any time during the movement of the transport unit Tn. This steering force $F_L$ can also be variable over time and can also be adapted to the respective transport unit Tn and also to the current movement. For example, a transport unit Tn laden with a heavier load or moving more quickly may require a higher steering force $F_L$ than an empty or slow-moving transport unit Tn.

The stator currents $i_{A1}$, $i_{A2}$ of the driving coils 7, 8 are preferably controlled so that the propulsive force $F_V$, required or predetermined by the higher-level system control unit 10 (FIG. 9) is maintained. Thus the advancing movement of the transport unit Tn remains unaffected by the generation of the steering effect L in the transfer position U. For example, in the exit region of the transfer position U (bottom of FIG. 4), at which only the driving coils 7 of one side are active, this may also mean that the q-component of the stator current $i_{A1}$ which produces the propulsive force $F_V$ must be simultaneously increased in order to maintain the propulsive force $F_V$. However, the propulsive force $F_V$ is generally set in any case by the position control of the transport unit Tn and therefore it is normally not necessary to intervene in this control of the propulsive force $F_V$ in the transfer position U.

At the entry of the transport unit Tn into the transfer position U the active control of the lateral force-forming current components $i_{Ad1}$, $i_{Ad2}$ of the stator currents $i_{A1}$, $i_{A2}$ is started. It is not absolutely necessary that electromagnetic lateral forces $F_{EMS1}$, $F_{EMS2}$ are already generated at the entry on both sides of the transport unit Tn. However, the electromagnetic lateral forces $F_{EMS1}$, $F_{EMS2}$ must be controlled in the transfer region by the stator currents $i_{A1}$, $i_{A2}$ at any time so that the required steering force $F_L$ is produced in the desired direction and with the required magnitude. In order to ensure a defined position of the transport unit Tn over the entire length of the transfer position U it is, however, advantageous if the electromagnetic lateral forces $F_{EMS1}$, $F_{EMS2}$ are actively controlled on both sides along the entire length of the transfer position U.

At the exit of the transport unit Tn from the transfer position U (bottom of FIG. 4) the air gap between the untraveled transport section An and the transport unit Tn is simultaneously increased. As a result the excitation-magnetic lateral force $F_{PMS2}$ on this transport section An is substantially reduced, which assists the guiding of the transport unit Tn along the desired transport section Am. In particular this reduction of the excitation-magnetic lateral force $F_{PMS2}$ could be sufficient in order to move the transport unit Tn in the exit region along the desired transport section Am. The driving coils 8 at the exit of the transfer position U would also no longer have to be actively controlled in order to generate an electromagnetic lateral force $F_{EMS}$.

Figure 6:
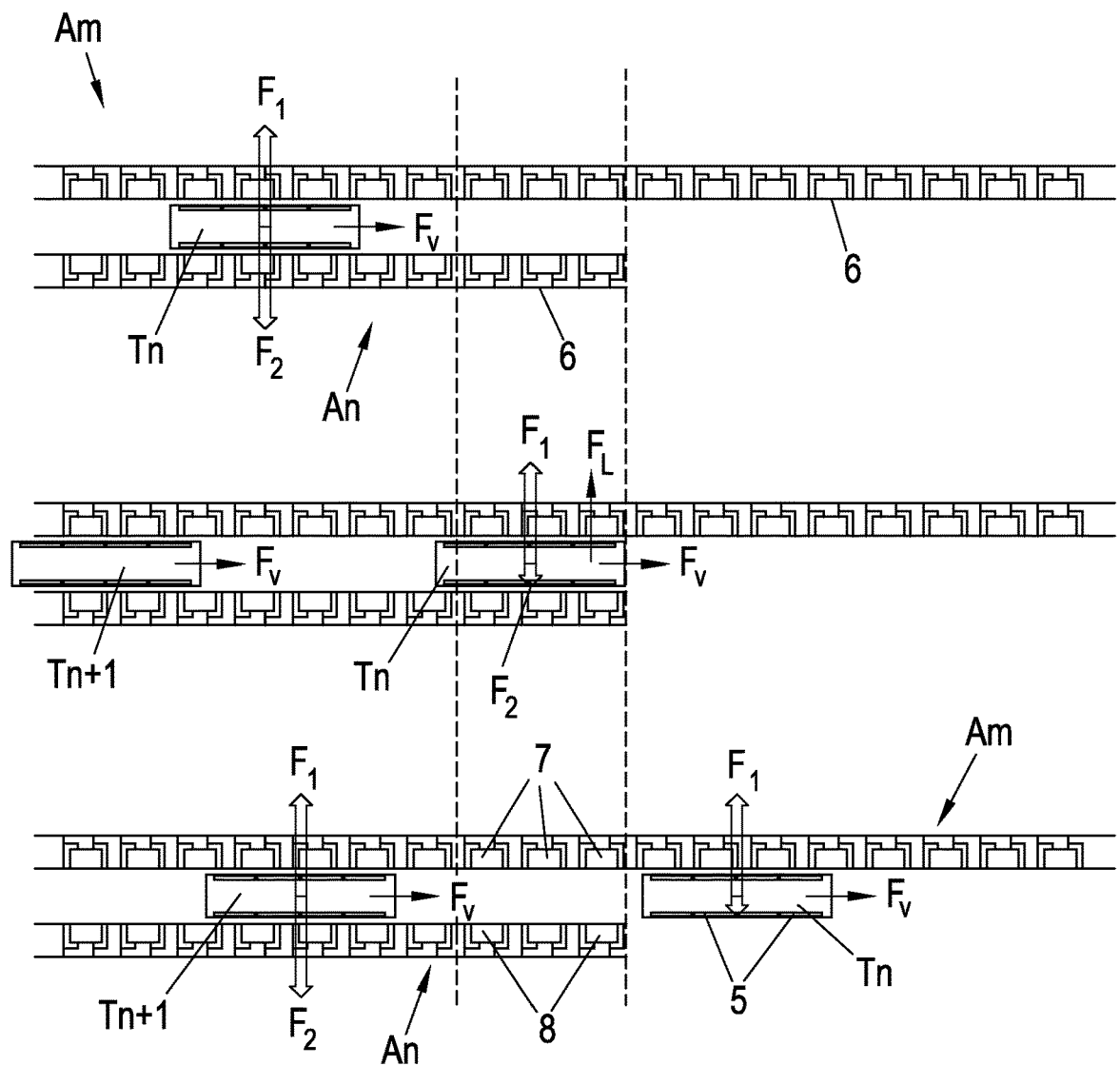
FIG. 6 shows a second application of a method according to the invention for transferring a transport unit at a transfer position.

However, the transfer position U does not have to be implemented as a switch point, but may also be implemented as a transfer from one transport section Am to another transport section An, such as for example the transfer position U1 in FIG. 1, where for example a transition from a two-sided transport section (driving coils on both sides) to a one-sided transport section (driving coils on one side) takes place. Such a situation is explained for example with reference to FIG. 6. In this case the entry, the transfer position and the exit can be controlled as in the case of a switch point according to FIG. 4. At the exit (bottom of FIG. 6) the excitation-magnetic lateral force $F_{PMS2}$ on the transport section An is also reduced without active control of the lateral force-forming current component $i_{Ad2}$ of the stator current $i_{A2}$. On the opposite side of the transport section Am the electromagnetic lateral force $F_{EMS1}$ can be maintained for guiding purposes (for example if the excitation-magnetic guiding alone is not reliably sufficient). This means that in this case it would be sufficient in principle if the electromagnetic lateral force $F_{EMS}$ is controlled on only one side in the region of the entry (top of FIG. 6) or the transfer region (middle of FIG. 6). It is not absolutely necessary to control the electromagnetic lateral forces $F_{EMS1}$, $F_{EMS2}$ simultaneously on both sides. The procedure could be similar in the case of a transition from a one-sided transport section to a two-sided transport section.

Thus with the driving coils 7, 8 provided for the propulsion of the transport unit Tn the respective magnetic flux $\psi_1$, $\psi_2$ can be controlled in a transfer position U on both sides of the transport unit Tn by means of defining stator currents $i_{A1}$, $i_{A2}$, in order to generate a steering effect L which guides the transport unit Tn along one of the two transport sections Am, An in the transfer position. In this case the propulsive force $F_V$ can be maintained unchanged. This inventive idea can also be used in yet another advantageous way. This is explained with reference to FIG. 7.

Figure 7:
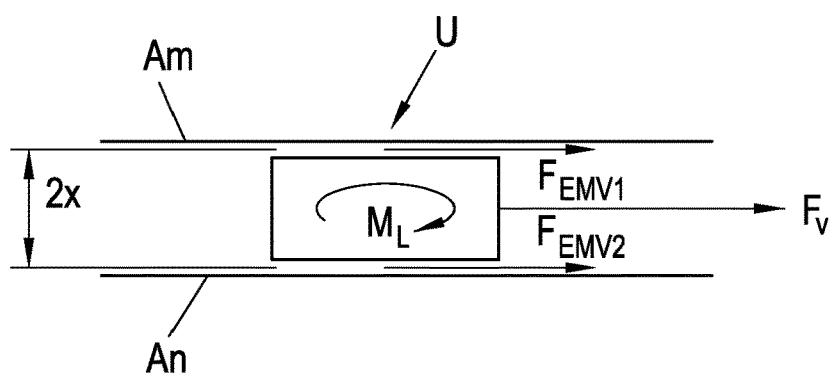
FIG. 7 shows the torques acting on the transport unit in a further embodiment for generating a steering effect.

As already described in detail above, in the transfer position U two transport sections Am, An meet one another. By the supply of the stator currents $i_{A1}$, $i_{A2}$ the driving coils 7, 8 in co-operation with the excitation magnets 4, 5 on both sides of the transport line generate propulsive force-forming electromagnetic force components $F_{EMV1}$, $F_{EMV2}$, which add up to the total propulsive force $F_V$ of the transport unit Tn, that is to say $F_V = F_{EMV1} + F_{EMV2}$. If the propulsive force-forming electromagnetic force components $F_{EMV1}$, $F_{EMV2}$ are of the same magnitude, the transport unit Tn is torque-free about a vertical axis of the transport unit Tn, on the assumption that it is constructed symmetrically about the longitudinal axis in the direction of movement. However, if the propulsive force-forming electromagnetic force components $F_{EMV1}$, $F_{EMV2}$ are of different magnitudes, a steering torque $M_L$ acts on the transport unit Tn about the vertical axis, as illustrated in FIG. 7. This steering torque $M_L$ can now likewise be used as a steering effect L for guiding the transport unit Tn along a desired transport section A.

The propulsive force $F_V$ is normally controlled by means of the position s of the transport unit Tn along the transport line, so that the transport unit Tn is at the set position at any time. Thus the current speed and the acceleration of the transport unit Tn is also controlled indirectly.

As is known, the propulsive force-forming electromagnetic force components $F_{EMV1}$, $F_{EMV2}$ result directly from the propulsive force-forming component $i_{Aq1}$, $i_{Aq2}$ of the respective introduced stator current $i_{A1}$, $i_{A2}$ by multiplication by a known force constant $K_f$. Without restricting the generality it is assumed hereafter that the electrical components of the long stator linear motor are configured to be the same on both sides, so that the force constant $K_f$ is also of the same magnitude on both sides. This results in the propulsive force-forming electromagnetic force components $F_{EMV1}$, $F_{EMV2}$ to $F_{EMV1} = K_f \cdot i_{Aq1}$ and $F_{EMV2} = K_f \cdot i_{Aq2}$. The propulsive force-forming component $i_{Aq1}$, $i_{Aq2}$ of the respective introduced stator current $i_{A1}$, $i_{A2}$ are controlled in a controller by means of the position error E of the transport unit Tn, in order to generate the required propulsive force $F_V$. In this case the position error E is given as the difference between a desired position $s_{soll}$ and an actual position $s_{ist}$, $E = s_{soll} - s_{ist}$. In this case the actual position $s_{ist}$ is detected by known means. Thus $F_{EMVj} = K_f \cdot i_{Aqj} = K_f \cdot K \cdot E = K_f \cdot K \cdot (s_{j,soll} - s_{j,ist})$ generally applies, with a control constant K. When it is also considered that the actual positions of the transport unit Tn must be the same on both sides, that is to say $s_{1,ist} = s_{2,ist}$, then it follows that $F_{EMV1} - F_{EMV2} = K_f \cdot K \cdot (s_{1,soll} - s_{2,soll})$.

If the desired positions of the two sides of the transport unit Tn are modified in each case by a modification factor $\Delta s_1$, $\Delta s_2$, that is to say $(s_{1,soll} + \Delta s_1$ and $s_{2,soll} + \Delta s_2)$, then a desired steering torque $M_L$ can be set by means of the modification factor. With the assumption $s_{1,soll} = s_{2,soll}$ this then results in $F_{EMV1} - F_{EMV2} = K_f \cdot K \cdot (\Delta s_1 - \Delta s_2)$ and the steering torque $M_L = (F_{EMV1} - F_{EMV2}) \cdot x = K_f \cdot K \cdot (\Delta s_1 - \Delta s_2) \cdot x$.

In a preferred embodiment the modification factor $\Delta s/2$ is added on one side and subtracted on the other side, resulting directly in the relationship $F_{EMV1} - F_{EMV2} = K_f \cdot K \cdot (s_{1,soll} - s_{2,soll} + \Delta s)$. In this case the assumption $s_{1,soll} = s_{2,soll}$ can be made again, since it is inteveneb by means of the modification factor $\Delta s$ and the result is $F_{EMV1} - F_{EMV2} = K_f \cdot K \cdot \Delta s$. If the distance between the centers of the two air gaps is designated by 2x (FIG. 7), the steering torque follows directly from $M_L = (F_{EMV1} - F_{EMV2}) \cdot x = K_f \cdot K \cdot \Delta s \cdot x$.

The propulsive force $F_V$ of the transport unit Tn is controlled by the position control in the form of the desired position presetting $s_{1,soll}$, $s_{2,soll}$. By setting the modification factor $\Delta s$, or the modification factors $\Delta s_1$, $\Delta s_2$, propulsive force-forming electromagnetic force components $F_{EMV1} = K_f \cdot K \cdot \Delta s/2$ and $F_{EMV2} = -K_f \cdot K \cdot \Delta s/2$ or $F_{EMV1} = K_f \cdot K \cdot \Delta s_1$ and $F_{EMV2} = K_f \cdot K \cdot \Delta s_2$ are generated which are superimposed on the original propulsive force-forming electromagnetic force components by the position control in the form of the desired position presetting $s_{1,soll}$, $s_{2,soll}$ and thus also on the propulsive force $F_V$ and which generate a desired steering torque $M_L$. In this case it is naturally sufficient that a propulsive force-forming electromagnetic force component $F_{EMV1}$, $F_{EMV2}$ is superimposed on only one side in order to generate a steering torque $M_L$.

By the use of a modification factor $\pm \Delta s/2$ it can be ensured in a simple manner that the propulsive force $F_V$ as the sum of the two propulsive force-forming electromagnetic force components $F_{EMV1}$, $F_{EMV2}$ is not influenced. Thus then the forward movement of the transport unit Tn is not influenced by the introduction of a steering torque $M_L$.

The steering torque $M_L$ can now be used as a steering effect L in a transfer position U in order to move the transport unit Tn along a desired transport section A, as is explained with reference to FIG. 8. A switch point is again shown there as a transfer position U. In the entry (top of FIG. 8) the propulsive force-forming electromagnetic force components $F_{EMV1}$, $F_{EMV2}$ are adjusted to the same value, resulting in $\Delta s = 0$ and $M_L = 0$. In the transfer region (middle of FIG. 8), by setting the modification factors $\Delta s_1$, $\Delta s_2$ steering torque $M_L$ is generated as described above, leading to the transport unit Tn being guided along the transport section Am and moved further along the transport section Am. In the exit region of the transfer position (bottom of FIG. 8) the transport unit Tn can then be driven only on one side and moved further (as in FIG. 8), or a drive can be provided on both sides.

Figure 8:
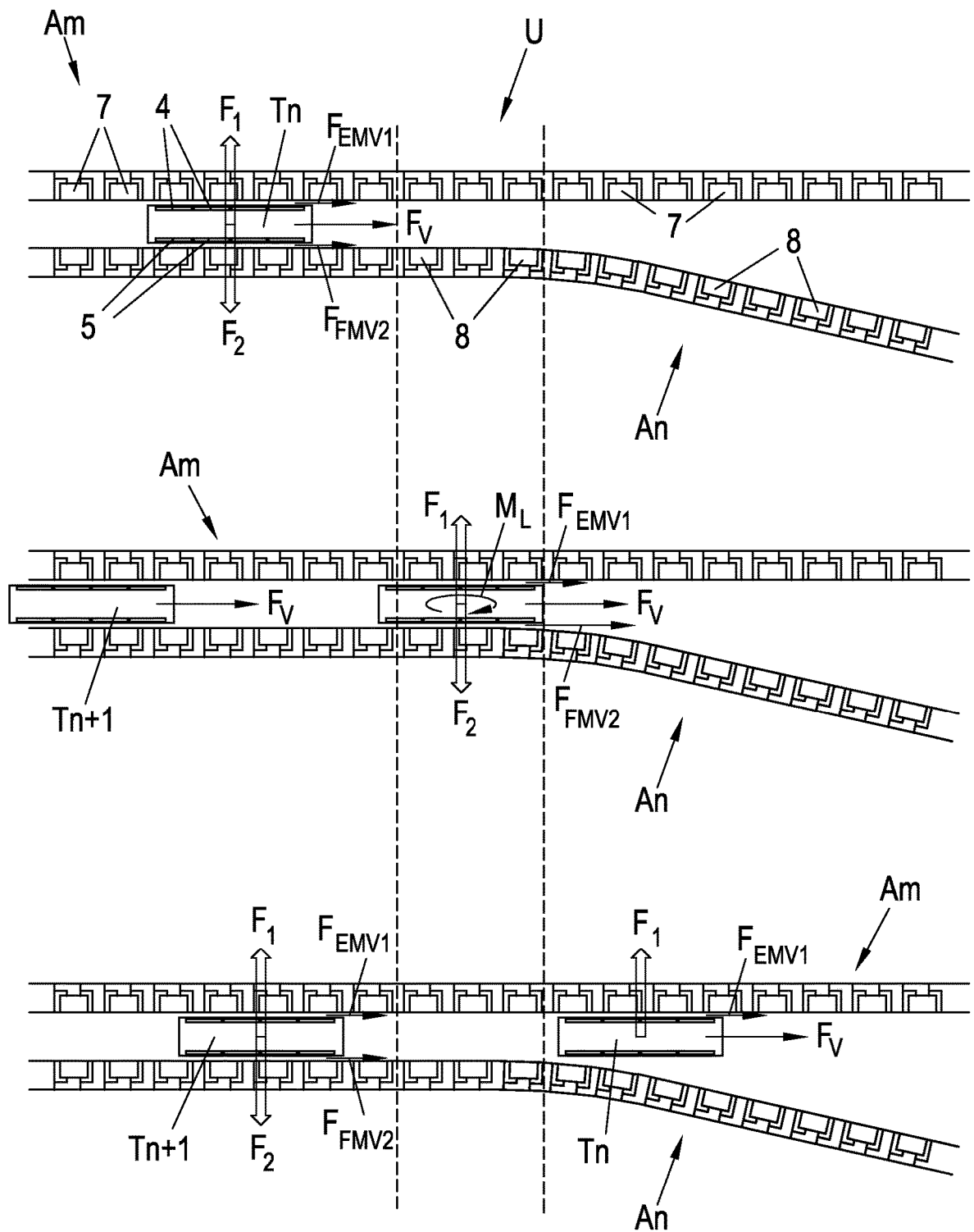
FIG. 8 shows a second embodiment of a method according to the invention for transferring a transport unit at a transfer position.

Naturally the method using the steering force $F_L$ and the method using the steering torque ML can also be combined, as indicated in FIG. 8.

The application of a sufficient steering force $F_L$ and/or of a sufficient steering torque $M_L$ naturally is in principle necessary only until the guide elements of the transport unit Tn, for example rollers, wheels, sliding surfaces, magnetic bearings, or the like, act reliably on the desired transport section A. Thus a defined position of the transport unit Tn is ensured and the active control of the driving coils 7, 8 for application of the steering effect L (steering force $F_L$ and/or steering torque $M_L$) can be ended.

Figure 9:
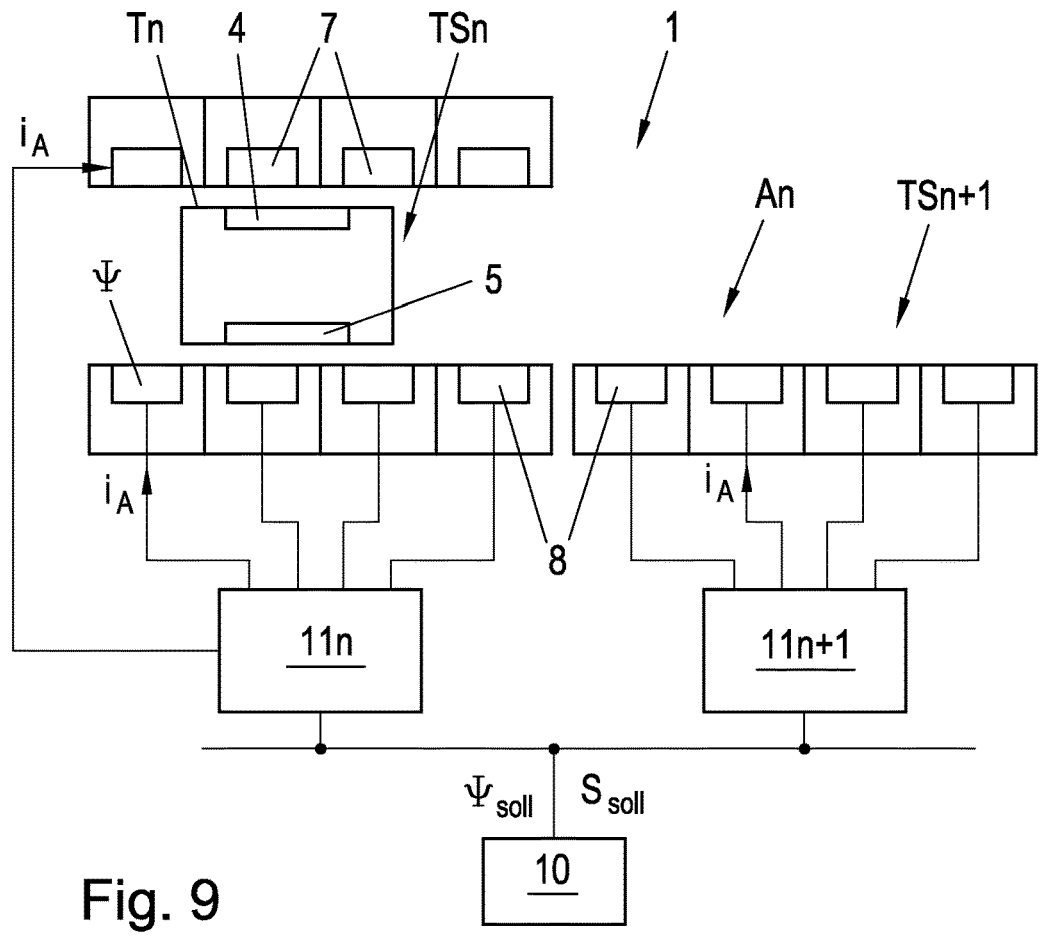
FIGS. 9 and 10 show a control concept for the method according to the invention.

The control concept for the transport device 1 and thus also for the transfer position U according to the invention will now be explained with reference to FIGS. 9 and 10.

A higher-level control unit 10 is responsible for the movement of the transport units Tn in the long stator linear motor along the transport line. Thus the control unit 10 controls the movement of the transport units Tn, for example by the setting of desired position values $s_{soll}$, and thus also controls the speed and acceleration of the transport units Tn. Likewise the higher-level control unit 10 is also responsible for guiding the transport unit Tn along the transport device 1 and thus also for steering the transport units Tn in transfer positions U. Thus the control unit 10 also controls the steering effect L acting on the transport unit Tn, for example by setting of desired values of the magnetic flux $\psi_{soll}$, and thus determines the transport line along which the transport units Tn move in the transport device 1. For each of the moving transport units Tn the higher-level control unit 10 sets corresponding desired values for the position $s_{soll}$ and the magnetic flux $\psi_{soll}$.

A segment control unit $11n$, $11_{n+1}$, which controls the driving coils 7, 8 of the respective transport segment TSn, TSn+1 individually with a stator current $i_A$, is associated with each transport segment TSn, TSn+1, or generally with a group of driving coils 7, 8 or also with each driving coil 7, 8, of a transport section An. A separate segment control unit $11n$, $11_{n+1}$ can of course be provided for the driving coils 7, 8 on each side, wherein the segment control units $11_n$, $11_{n+1}$ on each side can also be connected to one another by means of a data line and can exchange data with one another. Each segment control unit $11_n$, $11_{n+1}$ generates from the desired value settings for the position $s_{soll}$ and the magnetic flux $\psi_{soll}$ a stator current $i_A$ which is supplied to the driving coils 7, 8. Preferably only the driving coils 7, 8 which interact with the transport unit Tn, or the excitation coils 4, 5 thereof, are controlled. The stator current $i_A$ is a current vector (current space vector) which comprises a propulsive force-forming component $i_{Aq}$ for generating the propulsive force $F_V$ and which causes a magnetic flux $\psi$. In the transfer position U modified propulsive force-forming electromagnetic force components $F_{EMV1}$, $F_{EMV2}$ and/or lateral force-forming electromagnetic force components $F_{EMS1}$, $F_{EMS2}$ which cause the required steering effect L can be introduced by means of the current vectors $i_{A1}$, $i_{A2}$. Thus in co-operation with the excitation magnets 4, 5 of the transport unit Tn, as described, at any time the stator current vector $i_A$ generates the desired action on the transport unit Tn, in particular a propulsive force $F_V$ and potentially a steering effect L (steering force $F_L$ and/or steering torque $M_L$).

Figure 10:
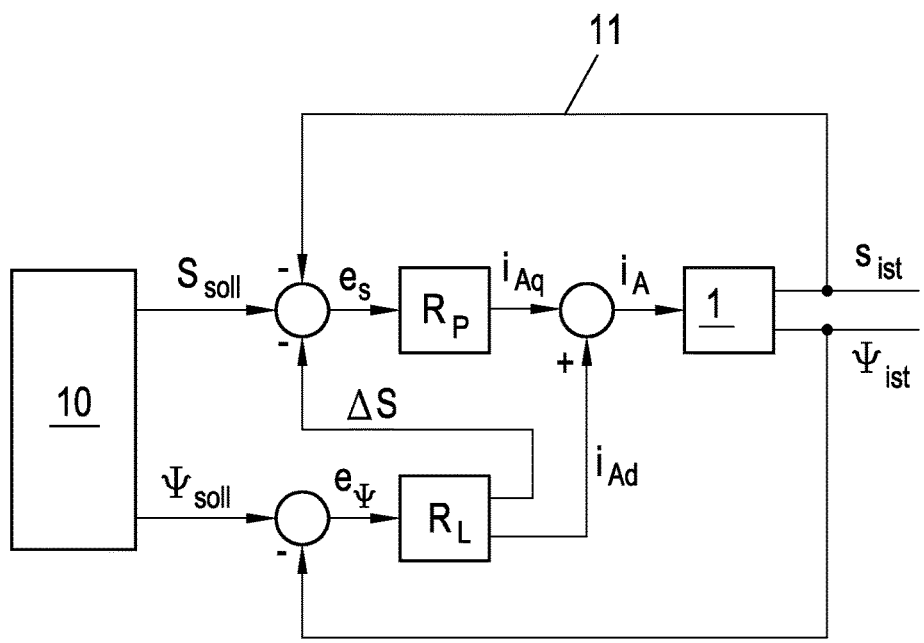

In a segment control unit 11, a steering controller RL for controlling the steering effect L and a position controller RP for controlling the position s are implemented for each driving coil 7, 8, as illustrated in FIG. 10. The control of the steering effect L is preferably active only in one transfer position U and takes place for example on the basis of the magnetic flux $\psi$ and a desired flux $\psi_{soll}$ is set as described above. In general only the propulsive force $F_V$ is controlled outside a transfer position U. The current actual flux $\psi_{ist}$ is measured or estimated by means of a suitable observer and is compared with the desired flux $\psi_{soll}$. In a transfer position U the steering controller RL compensates for the flux difference or the flux error $e_\psi=\psi_{ist}$ in order to generate the desired steering effect L. For this purpose any suitable controller can be used. To this end the steering controller RL calculates for the controlled driving coil 7, 8 a lateral force-forming current component $i_{Ad}$ of the stator current $i_A$ and potentially also a modification factor $\Delta s$ or $\Delta s/2$ (if a steering torque $M_L$ is also used as steering effect). The position controller RP compensates for a position error $e_s$ which results from the set desired position $s_{soll}$ and the current actual position $s_{ist}$. The actual position $s_{ist}$ can be measured or can also be determined in some other suitable manner, for example again by a control engineering observer. At least in a transfer position U, when the steering torque $M_L$ is used as a steering effect L, the position error $e_s$ also includes the modification factor $\Delta s$. Thus the position error $e_s$ results for example as $e_s = s_{soll} - s_{ist}$ [$-\Delta s/2$]. Any suitable controller can be used to compensate for the position error $e_s$. For position control the position controller RP determines for the controlled driving coil 7, 8 a propulsive force-forming current component $i_{Aq}$ of the stator current $i_A$. Thus both components of the stator current $i_A$ are present and the set stator current $i_A$ can be supplied to the controlled system, in this case the transport device 1 or the designated parts, in particular the controlled driving coil 7, 8.

What is claimed:

1. A method for transferring a transport unit of a long stator linear motor at a transfer position from a first transport section, having a number of driving coils arranged on a first guide structure one behind the other in a direction of movement of the transport unit in a region of the transfer position, to a second transport section, having a number of driving coils arranged on a second guide structure one behind the other in a direction of movement of the transport unit in the region of the transfer position, wherein, on each side of the transport unit, excitation magnets are arranged to interact with driving coils in a region of the transport unit, wherein on both sides of the transport unit excitation-magnetic lateral forces are acting on the transport unit by an interaction of the excitation magnets with ferromagnetic components of the first and second guide structures, comprising:

supplying on at least one side of the transport unit a stator current in at least one driving coil in the region of the transfer position that generates a lateral force-forming electromagnetic force that acts on the transport unit, so that a resulting lateral force, as a sum of the acting excitation-magnetic lateral force and of the lateral force-forming electromagnetic force, on each side of the transport unit is different to produce a steering effect on the transport unit at the transfer position.

2. The method according to claim 1, wherein the lateral force-forming electromagnetic force is produced on both sides of the transport unit.

3. The method according to claim 2, wherein the lateral force-forming electromagnetic forces produced on both sides of the transport unit are generated in a same direction.

4. The method according to claim 2, wherein lateral force-forming electromagnetic forces produced on both sides of the transport unit are generated in different directions.

5. The method according to claim 1, wherein several driving coils interact with excitation magnets on the transport unit at a same time and the stator current is supplied in at least one of the several driving coils.

6. The method according to claim 1, wherein a propulsive force acting on the transport unit is controlled with a propulsive force forming current component of the stator current and the steering effect is controlled at the transfer position with a lateral force forming current component of the stator current.

7. The method according to claim 6, wherein the propulsive force is controlled with a position controller for controlling a position of the transport unit, said position controller determines the propulsive force forming current component from a position error that is determined with a desired position and an actual position.

8. The method according to claim 6, wherein the steering effect is controlled with a steering controller, said steering controller determines the lateral force forming current component from a flux error as the difference between a desired flux and an actual flux.

9. The method according to claim 6, wherein the lateral force-forming electromagnetic force is superimposed on the propulsive force.

10. The method according to claim 9, wherein the stator current in the at least one driving coil in the region of the transfer position further generates a propulsion force-forming electromagnetic force that acts on the transport unit, which provides further steering of the transfer unit.

11. The method according to claim 10, wherein the propulsive force-forming electromagnetic force is superimposed on the propulsive force.

12. The method according to claim 5, wherein the several driving coils interact with excitation magnets on the transport unit at the same time and the stator current is supplied in only one of the several driving coils.

13. The method according to claim 5, wherein the several driving coils interact with excitation magnets on the transport unit at the same time and a stator current is supplied in all of the several driving coils.

14. The method according to claim 6, wherein the stator current in the at least one driving coil is supplied as a current vector with a lateral force-forming electromagnetic component.

15. The method according to claim 14, wherein the current vector further includes a propulsive force-forming electromagnetic component.

16. The method according to claim 15, wherein the steering effect is controlled with a steering controller that compensates for a flux error as a difference between a desired flux and an actual flux, and determines the lateral force-forming electromagnetic component of the stator current, and wherein the propulsive force is controlled with a position controller that compensates for a position error as a difference between a desired position and an actual position, and determines the propulsive force-forming electromagnetic component of the stator current.

* * * * *